United States Patent [19]

Blake et al.

[11] Patent Number: 5,069,573

[45] Date of Patent: Dec. 3, 1991

[54] DEVICE FOR RELEASABLY COUPLING ELONGATE CYLINDRICAL MEMBERS

[75] Inventors: Jimmy H. Blake, Woodinville; Carl R. Blake, Kirkland, both of Wash.

[73] Assignee: UCO, Inc., Redmond, Wash.

[21] Appl. No.: 639,918

[22] Filed: Jan. 10, 1991

[51] Int. Cl.[5] ............................................. F16B 7/08
[52] U.S. Cl. ................................... 403/191; 403/350; 403/233
[58] Field of Search ............... 403/350, 351, 352, 233, 403/235, 191

[56] References Cited

U.S. PATENT DOCUMENTS

| 633,163 | 9/1989 | Sicka | 403/352 |
|---|---|---|---|
| 3,419,227 | 12/1968 | Werkmeister et al. | 242/72 |
| 3,776,650 | 12/1973 | Zenhausern | 403/233 X |
| 4,076,437 | 2/1978 | Mazzolla | 403/350 |
| 4,124,258 | 11/1978 | Hafner | 308/236 |
| 4,261,599 | 4/1981 | Streed | 285/81 |
| 4,315,585 | 2/1982 | Seitz | 403/350 X |
| 4,365,535 | 12/1982 | Buttner et al. | 84/421 |
| 4,585,367 | 4/1986 | Gall | 403/104 |
| 4,655,108 | 4/1987 | Galos | 403/350 X |

Primary Examiner—Andrew V. Kundrat
Attorney, Agent, or Firm—Christensen, O'Connor, Johnson & Kindness

[57] ABSTRACT

A device for releasably securing together two elongate cylindrical members in predetermined transversely extending relation and in selected axial and rotational relation. The device includes a housing (12) having a first bore (30) in which one end of a cylindrical member (B) is received, and a second bore (14) extending through the housing transversely to the first bore. The second bore is sized to receive a second cylindrical member (A) with close sliding fit. The device includes a key latch (40) and ring cam (60) which are couplable with the housing and the second cylindrical member for urging the second cylindrical member into frictionable engagement with portions of the sidewall of the second bore so as to lock the second member in the housing in selected axial and rotational relation to the first member. The force with which the second cylindrical member frictionally engages the sidewall of the second bore varies as a function of the rotational position of the ring cam.

11 Claims, 5 Drawing Sheets

DEVICE FOR RELEASABLY COUPLING ELONGATE CYLINDRICAL MEMBERS

FIELD OF THE INVENTION

The present invention relates to releasable locking devices, and more particularly to devices for releasably locking two elongate cylindrical members in selected physical relation to one another.

BACKGROUND OF THE INVENTION

The need frequently arises in a wide variety of mechanical contexts to releasably secure together cylindrical members, e.g., tubes or rods. In some cases it is desirable to attach first and second cylindrical members in coaxial relation. Devices for achieving such coaxial attachment of cylindrical members are disclosed in U.S. Pat. Nos. 3,419,227, 4,124,258, 4,365,535, and 4,585,367. All of these devices include eccentric ring cams which are designed and rotatably mounted so as to secure the outer cylindrical member to the inner cylindrical member with a force that varies as a function of the rotational position of the ring cam.

In other cases it is desirable to attach elongate cylindrical members in end-to-end relation. U.S. Pat. Nos. 4,076,437 and 4,261,559 disclose devices for achieving such end-to-end attachment of cylindrical members. The devices disclosed in these patents include eccentric ring cams for securing one of the members to the other with a force that varies as a function of the rotational position of the ring cam.

A third class of devices exists for releasably securing a first tubular member to a second tubular member so that the axis of the first member extends transversely to the axis of the second member. Such devices are used, for instance, in the manufacture of tubular backpack frames for securing the ends of horizontally-extending members to the ends or midlength portions of vertically-extending members. One such device is used in backpack frames of the type manufactured by JanSport Corporation of Everett, Wash. This device consists of a housing having a first bore for receiving one end of a tubular member and a second bore, extending perpendicular to the first bore, for receiving a midlength or end portion of a second tubular member. One end of the first tubular member is axially and rotationally secured to the housing within the first bore using a bolt which extends through the housing so as to intersect the first bore and the first member positioned therein. The second tubular member is secured within the second bore via a set screw which engages the outer surface of the second member. The second member may be moved axially and rotationally relative to the first member by loosening the set screw and then moving the second member relative to the first member as desired. Once the desired rotational and axial position is achieved, the second member is secured relative to the first member by tightening the set screw.

Although the above-described backpack frame tube coupler device does permit a first tubular member to be releasably secured in selected axial and rotational relation to a second tubular member, the device suffers from several drawbacks which limit its utility. First, the set screw of the device can only be locked and unlocked with a screwdriver or other suitable tool. Because adjustment of a backpack frame is occasionally required during use of the backpack, a screwdriver or other appropriate implement must be carried on backpacking trips. Certain backpack users find the need to carry such tools objectionable. Second, if the set screw in the device is tightened sufficiently to engage the outer surface of the second tubular member but not tight enough to lock the second tubular member within the housing, the possibility exists, over time, that the set screw will score a portion of the outer surface of the second member. Such scoring may result in premature failure of the second tubular member.

Thus, a strong need exists for a locking device for releasably securing together first and second elongate cylindrical members in transversely extending relation which permits the first member to be moved axially and rotationally relative to the second member when in the unlocked position, and which secures together the first and second members when in the locked position, which device is operable between the locked and unlocked positions without resort to a screwdriver or other tool.

DETAILED DESCRIPTION OF THE INVENTION

Figure 1:
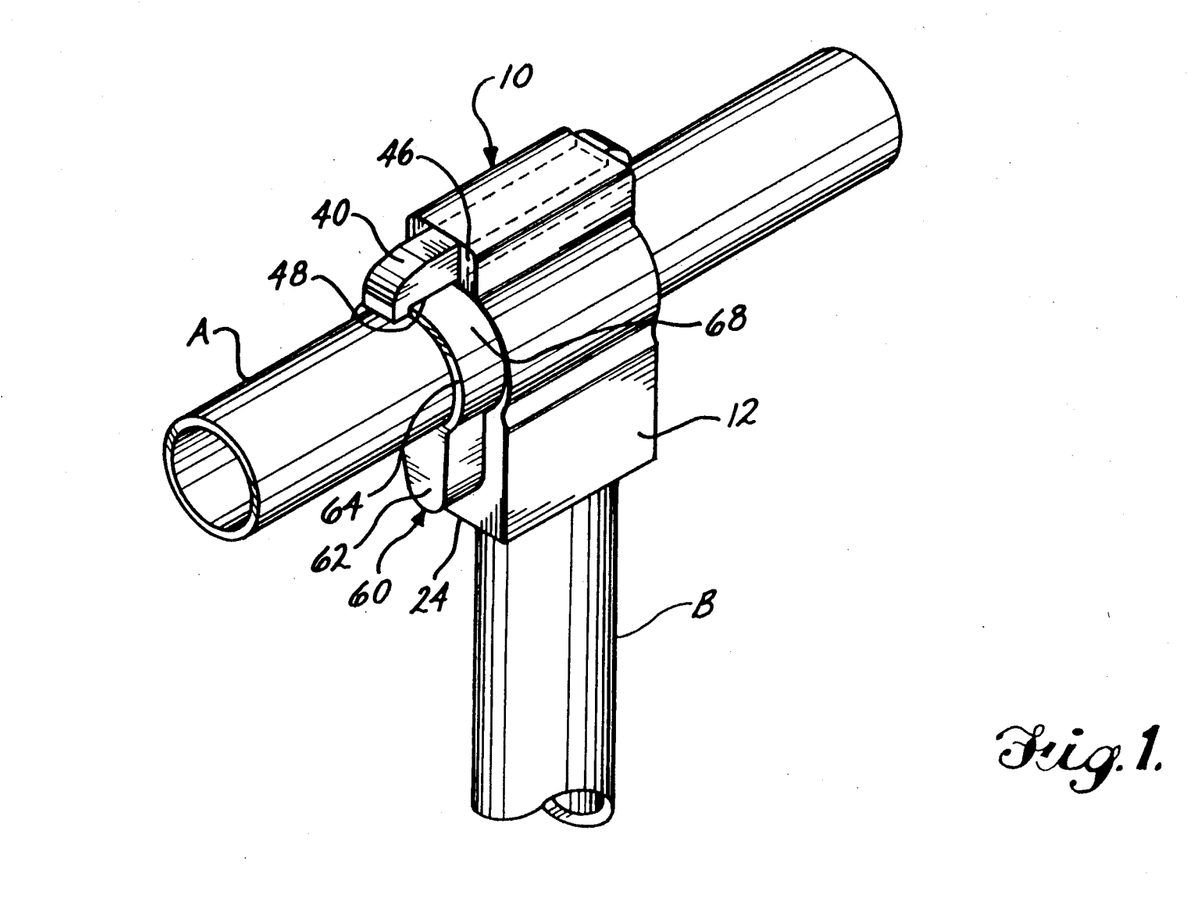
FIG. 1 is a perspective view of one embodiment of the present invention.
Figure 2:
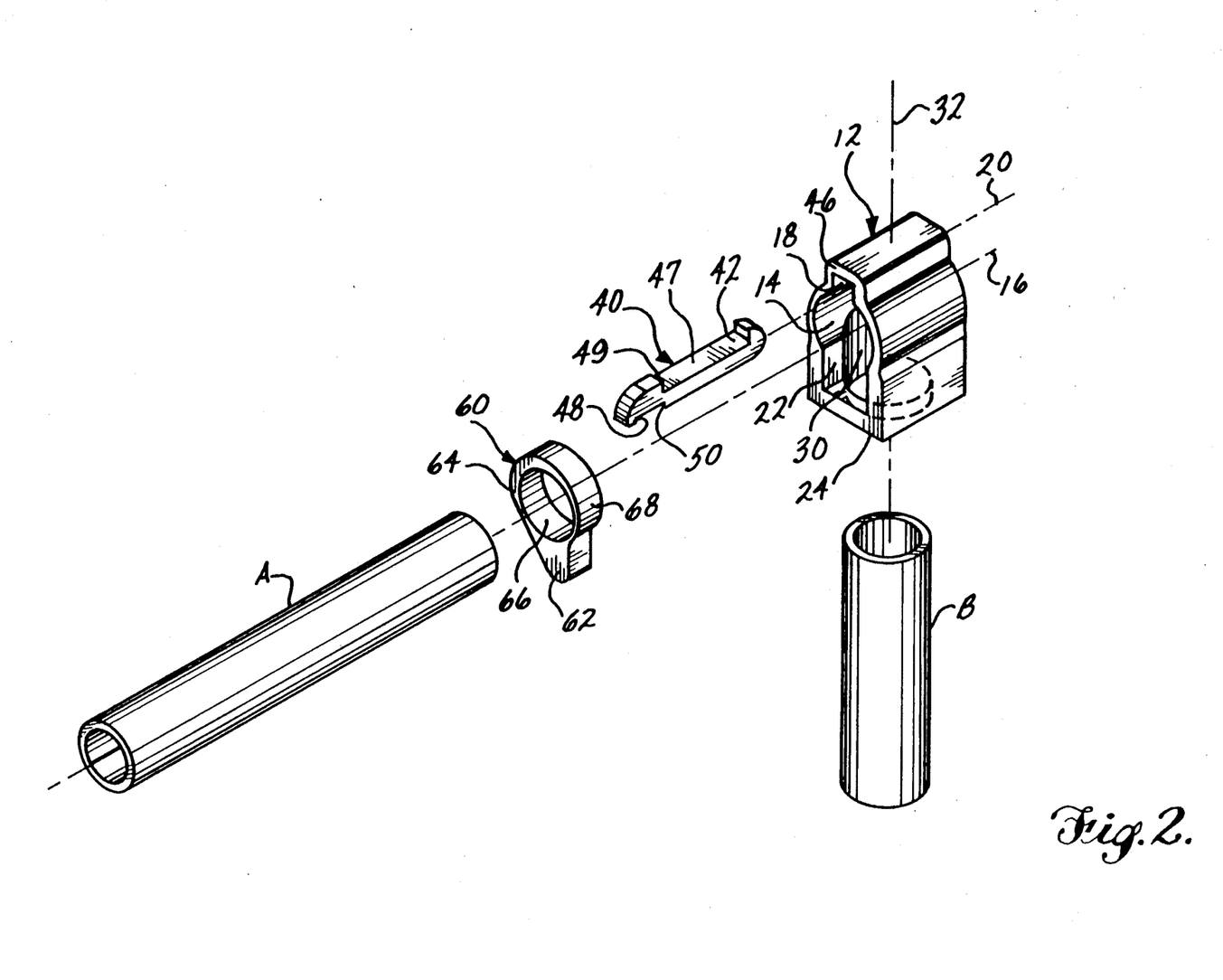
FIG. 2 is an exploded perspective view of the device illustrated in FIG. 1.

Referring to FIGS. 1 and 2, the present invention is a coupling device for releasably securing together first and second elongate cylindrical, typically tubular, members so that one of the members extends in predetermined transverse, and selected axial and rotational, relation to the other member.

One embodiment of the invention, identified at 10 in FIGS. 1 and 2, comprises a housing 12 including a central bore 14 extending entirely through the housing along longitudinal axis 16. The diameter of central bore 14 is selected so that an elongate cylindrical member, such as tubular member A illustrated in FIGS. 1 and 2, may be received with a close sliding fit in the central bore. Housing 12 also includes an elongate groove 18 having an axis of elongation 20 which extends parallel to longitudinal axis 16. Groove 18 is in communication with bore 14 along the entire length of the groove. To reduce the weight of housing 12, an additional opening 22 may be provided extending through housing 12. If opening 22 is provided, it is important, to preserve the structural integrity of housing 12, that the bottommost portion of opening 22 terminate a suitable distance (e.g., 0.25 in.) above bottom edge 24 of housing 12. Additionally, opening 22 preferably, although not necessarily, is in communication with bore 14.

Housing 12 also includes a transverse bore 30 which intersects central bore 14 and extends transversely thereto. In the embodiments of the invention illustrated in the Figures, the longitudinal axis 32 of transverse bore 30 extends perpendicular to the longitudinal axis 16 of central bore 14. However, it is to be appreciated that transverse bore 30 may be formed in housing 12 so that its longitudinal axis 32 extends in nonorthogonal relation to longitudinal axis 16 of central bore 14. For instance, bore 30 may be formed so that its longitudinal axis 32 extends at a 45° angle to the longitudinal axis 16 of central bore 14. The diameter of transverse bore 30 is selected so that an end of tubular member B may be received with a close sliding fit in the transverse bore. The end of tubular member B is secured within transverse bore 30 by conventional fasteners (e.g., a nut and bolt), adhesives, or by welding.

Referring now to FIGS. 1-4, device 10 additionally comprises an elongate key latch 40. Key latch 40 is preferably a straight shaft having a rectangular cross-sectional configuration and a length somewhat greater than the length of housing 12 (as measured along longitudinal axis 16). Key latch 40 includes an upper groove 42 formed in the top surface of the key latch so as to extend along all but the frontmost and rearmost portions of the key latch. The length of upper groove 42 and the length of key latch 40, as measured along the long dimension of the key latch, are selected so that the latter may be positioned in groove 18 in housing 12, with the upstanding portions of key latch 40 defining the ends of upper groove 42 engaging the uppermost portions of the front surface 46 and back surface (not shown) of housing 12 as illustrated in FIG. 2. The thickness of latch 40 is selected so that when key latch 40 is received within the groove 18 so that the bottom surface 47 of upper groove 42 engages the upper surface (not shown) of groove 18, the bottom surface of latch 40 will be radially spaced from axis 16 of central bore 14 a distance equal to the radial spacing between the sidewall of bore 14 and axis 16. Thus, the bottom surface of latch 40 fills in the gap formed by the presence of groove 18 in the upper portion of the cylindrical sidewall defined by bore 14.

Key latch 40 also includes a bottom groove 48 formed in the frontmost portion of the bottom surface of the key latch. Bottom groove 48 is positioned relative to upper groove 42 so that the leading edge 49 (FIG. 2) of the upper groove is substantially coplanar with the trailing edge 50 (FIG. 2) of the bottom groove. With this relative placement of leading edge 49 and trailing edge 50, leading edge 49 is substantially coplanar with front surface 46 of housing 12 when key latch 40 is positioned within groove 18 so that the bottom surface 47 of upper groove 42 engages the upper surface of groove 18.

Figure 3:
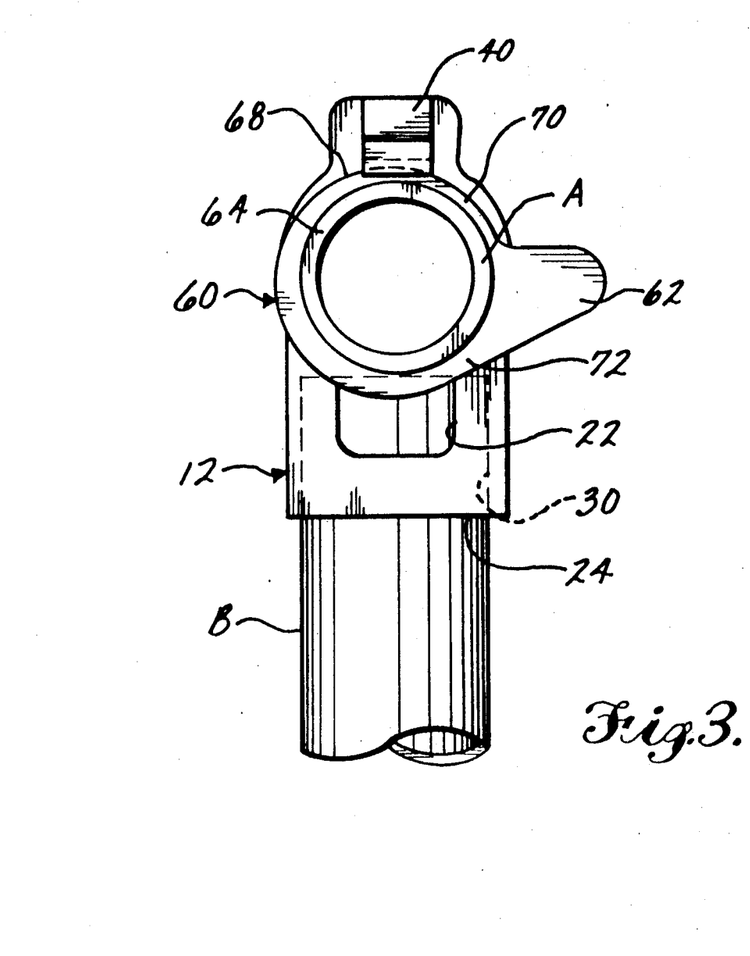
FIG. 3 is an end view of the device illustrated in FIG. 1, with the ring cam being shown in the unlocked position.
Figure 4:
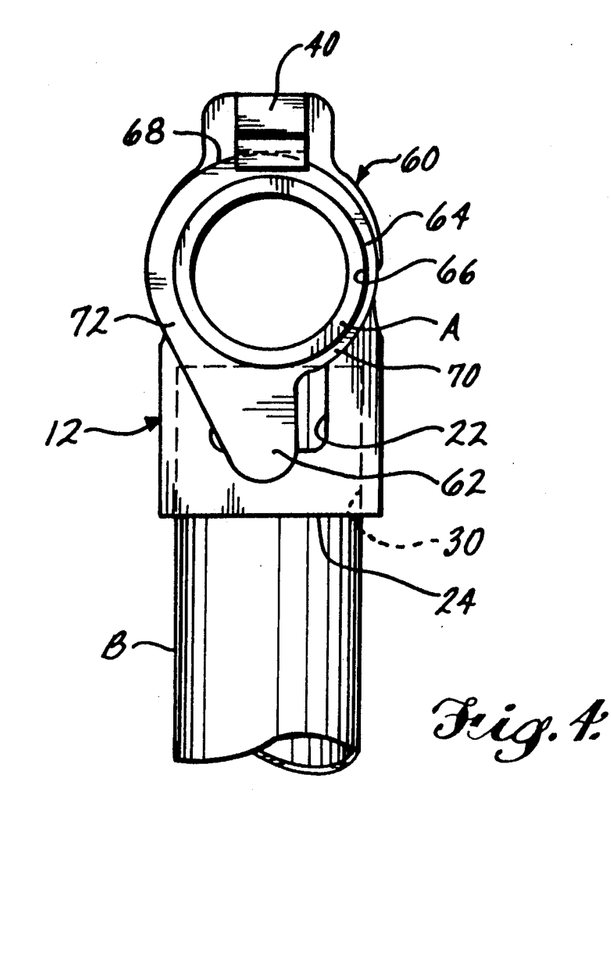
FIG. 4 is similar to FIG. 3 except the ring cam is shown in the locked position.

Referring to FIGS. 1-4, device 10 additionally comprises ring cam 60. The latter includes a thumb latch portion 62 and a ring portion 64. The latter is defined by a bore 66 which extends entirely through ring cam 60 and has a diameter selected so that tubular member A may be received with a close sliding fit in the bore. Ring portion 64 also includes a cylindrical outer surface 68. Bore 66 is positioned in ring cam 60 so that the radial thickness of ring portion 64 increases progressively from location 70 to location 72, as measured in a counterclockwise direction around the circumference of outer surface 68 (as seen in FIGS. 3 and 4). The width of ring portion 64, as measured along the longitudinal axis of bore 66, is slightly less than the length of bottom groove 48 in key latch 40, as measured along the length of the key latch, so as to permit ring portion 64 to be received within groove 48, as illustrated in FIG. 1. The thickness of the thinnest portion of ring section 64, i.e., the portion adjacent location 70, is selected so that when key latch 40 is received within groove 18 of housing 12, as illustrated in FIG. 1, and ring portion 64 of ring cam 60 is received within bottom groove 48 of key latch 40, as illustrated in FIG. 3, the ring cam may be positioned so that its longitudinal axis is coaxial with longitudinal axis 16 of central bore 14. The thickness of the thickest portion of ring portion 64, i.e., the portion adjacent location 72, is selected so that when key latch 40 is received within groove 18 of housing 12, as illustrated in FIG. 1, and ring portion 64 of ring cam 60 is received within bottom groove 48 of key latch 40, as illustrated in FIG. 4, the longitudinal axis of bore 66 in ring cam 60 extends parallel to, but is radially displaced from, the longitudinal axis 16 of central bore 14. The difference in thickness of ring portion 64 between location 70 and location 72 will vary depending upon the composition of the cylindrical member to be secured and whether or not the cylindrical member is hollow. In one embodiment of the invention designed to secure a hollow tubular member within central bore 14 in housing 12, the tubular member being made from aluminum and having an outside diameter of 0.625 inches and a wall thickness of about 0.002 inches, ring portion 64 has a radial thickness of 0.050 inches at location 70 and a radial thickness of 0.100 inches at location 72. In this embodiment, the radial thickness of those sections of ring portion 64 between locations 70 and 72 increases in linear fashion from location 70 to location 72.

Figure 5:
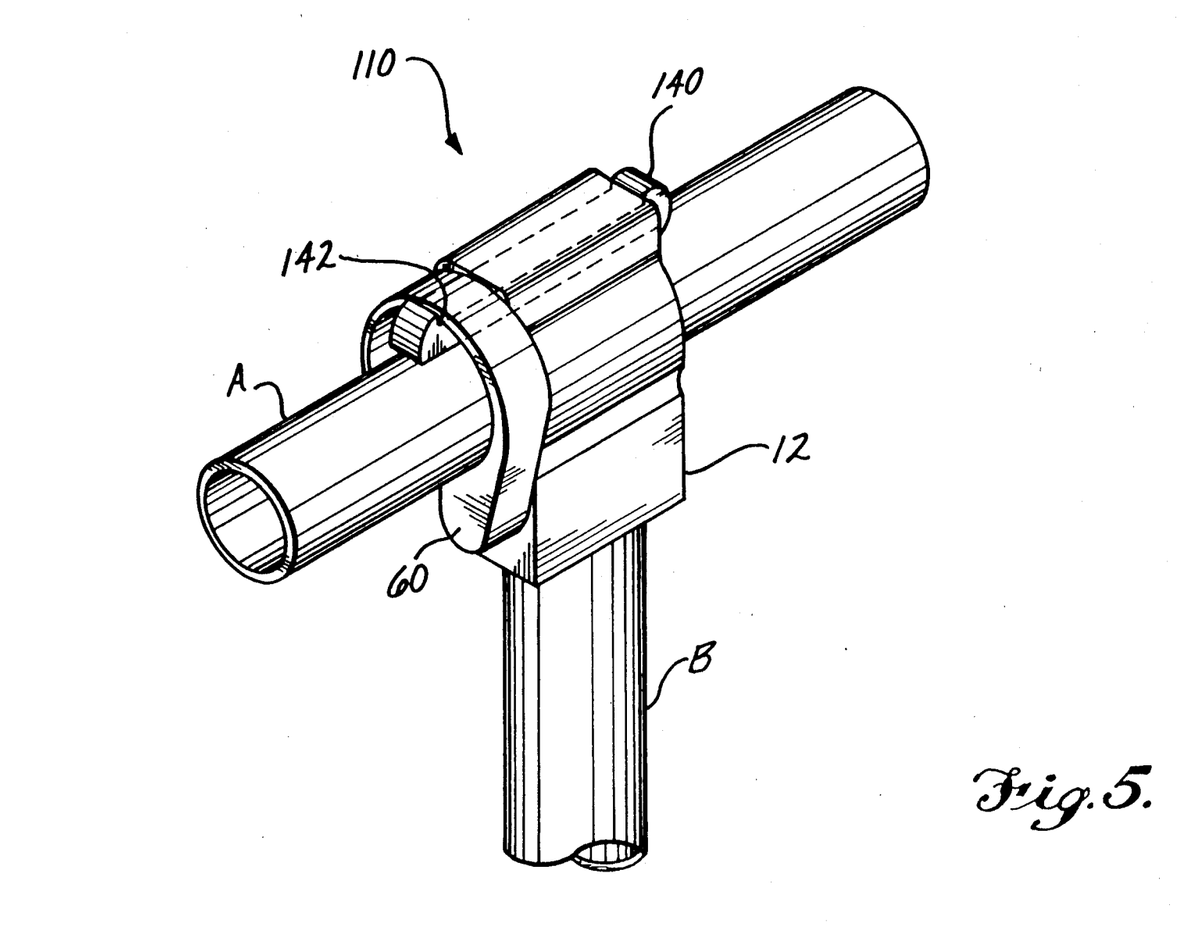
FIG. 5 is a perspective view of another embodiment of the invention.

An alternative embodiment of the present invention is identified at 110 in FIG. 5. Device 110 includes housing 12 and ring cam 60 of device 10. Device 110 differs from device 10 in that it includes key latch 140 in place of key latch 40. Key latch 140 is identical in construction to key latch 40, except that it does not include bottom groove 48 and the length of its upper groove 142 is increased relative to groove 42 so that the distance between the upstanding portions of the key latch defining the ends of the upper groove is substantially equal to (a) the width of the ring portion 64, as measured along the longitudinal axis of bore 66, plus (b) the length of the uppermost portion of housing 12 (i.e., that portion in which groove 18 is disposed), as measured along longitudinal axis 16 of bore 14. Device 110 is assembled in the same manner as device 10, except that the frontmost portion of key latch 140 is positioned in bore 66 so that ring portion 64 is received in the frontmost portion of upper groove 42.

It is preferred that housing 12, key latch 40 or 140, depending on embodiment considered, and ring cam 60 be made from aluminum, plastic, or other lightweight, yet rigid, material. In some circumstances where weight is not a factor, other materials may be used, and opening 22 in housing 12 may be omitted. The size of housing 12, key latch 40 or 140, and ring cam 60 will vary depending upon the size of the cylindrical members to be releasably secured to one another.

In connection with the following discussion of the operation of device 10, reference should be made to FIGS. 1-4. Initially, one end of tubular member B is positioned in transverse bore 30 in housing 12 and is locked in selected axial rotational position within the bore by use of appropriate fasteners, adhesives, or by welding. Key latch 40 and ring cam 60 are coupled with one another and with housing 12 as illustrated in FIG. 1. Ring cam 60 is then rotated to the position illustrated in FIG. 3. In this position, the thinnest sections of ring portion 64 are received within bottom groove 48 of key latch 40 so that outer surface 68 of ring portion 64 engages the base (bottom) surface of bottom groove 48. As noted above, the construction of ring cam 60 is selected so that the longitudinal axis of bore 66 in ring cam 60 is coaxial with longitudinal axis 16 of central bore 14 when the ring cam is positioned as illustrated in FIG. 3.

Next, tubular member A is inserted through bore 66 in ring cam 60 and into bore 14 in housing 12 so that a selected portion of the tubular member is positioned within the housing. Tubular member A is then rotated about its axis of elongation within housing 12 until the longitudinal axis 32 of transverse bore 30, and hence the axis of elongation of tubular member B, lies in selected rotational relation to tubular member A. In certain applications, the desired relationship between tubular member A and longitudinal axis 32 of transverse bore 30 may be achieved by causing housing 12 and tubular member B attached thereto to rotate about the axis of elongation of tubular member A.

In any event, once a selected portion of tubular member A is received within housing 12, and the longitudinal axis 32 of transverse bore 30, and hence the axis of elongation of tubular member B, is positioned in selected rotational relation to tubular member A, ring cam 60 is caused to rotate in clockwise direction from the position illustrated in FIG. 3 to the position illustrated in FIG. 4. As ring cam 60 moves from the position illustrated in FIG. 3 to the position illustrated in FIG. 4, increasingly thicker portions of ring portion 64 are received within bottom groove 48 of key latch 40. During this rotation of ring cam 60, a point is reached due to the coaction of the ring cam with tubular member A and housing 12 where additional rotation of the ring cam forces tubular member A downwardly toward bottom edge 24 of housing 12. This downward movement causes the longitudinal axis of bore 66 to move from coaxial alignment with central bore 14 to parallel, radially displaced alignment with the central bore. Because bore 66 is sized to receive tubular member A with a close sliding fit, as ring cam 60 moves downwardly it causes the bottom sections of the portion of tubular member A received within housing 12 to press downwardly against bottom portions of the sidewall of central bore 14 with a force that increases with additional rotation of ring cam 60 in the clockwise direction. Eventually, a point is reached where the bottom sections of the portion of tubular member A received within housing 12 frictionally engage the bottom portions of the sidewall of central bore 14 with a force sufficient to prevent the tubular member A from moving axially and rotationally within the central bore.

Additionally, as ring cam 60 is rotated in a clockwise direction, outer surface 68 of ring portion 64 frictionally engages the base surface of groove 48 in key latch 40 with a force that increases with rotation of the ring cam. At a point in the clockwise rotation of ring cam 60, the frictional engagement between the ring cam and the base surface of bottom groove 48 will be sufficiently great as to cause the ring cam to remain in the position selected by the user of device 10.

Because key latch 40 is loosely captivated within groove 18 in housing 12, as ring cam 60 is moved from the position illustrated in FIG. 3 to the position illustrated in FIG. 4 the front end of key latch 40 is urged upwardly. This upward movement of the front end of key latch 40 causes the rear portion of the key latch to move downwardly against tubular member A, thereby forcing the portion of tubular member A in contact with the rear portion of the key latch downwardly so as to frictionally engage bottom portions of the sidewall central bore 14 with a force that increases with increased rotation of the ring cam in a clockwise direction. Thus, both front and rear sections of the portion of tubular member A received within central bore 14 are urged downwardly so as to frictionally engage the sidewall of the central bore as ring cam 60 is caused to move in a clockwise direction.

The embodiment 110 of the invention illustrated in FIG. 5 functions in substantially the same manner as the embodiment of the invention illustrated in FIGS. 1-4 and described above. Thus, rotation of ring cam 60 in the clockwise direction causes tubular member A to engage the bottom portions of the sidewall central bore 14 with a force that increases with increased rotation of ring cam 60.

Figure 6:
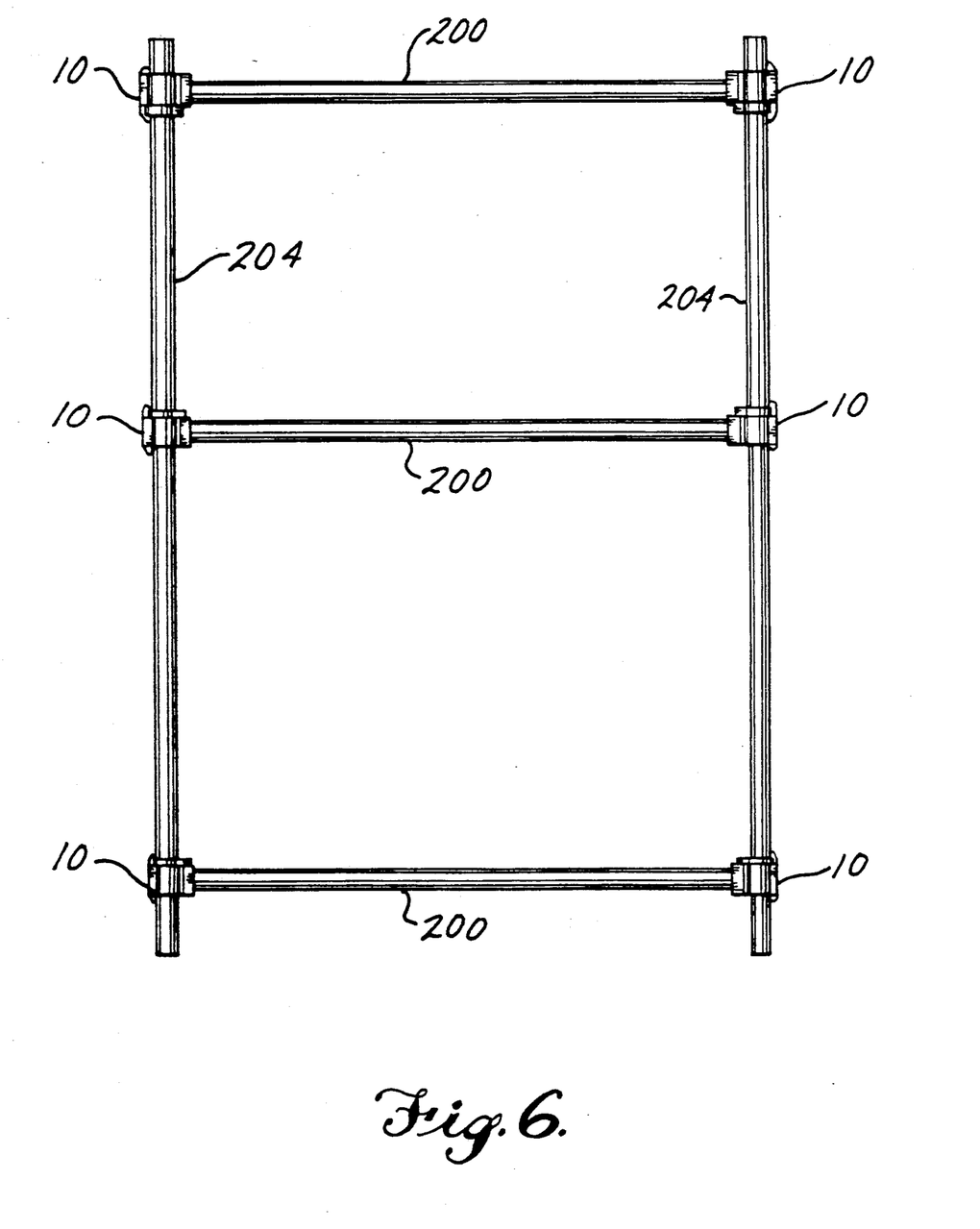
FIG. 6 is a schematic front view of a backpack frame incorporating the coupling device of the present invention.

Referring to FIG. 6, devices 10 and 110 are ideally suited for releasably securing together some or all of the tubular members of a backpack frame. For instance, the tubular cross members 200 of backpack frame 202 may be releasably secured to the tubular longitudinal members 204 using a plurality of coupling devices 10. Here, the ends of cross members 200 are inserted in the transverse bores 30 in associated devices 10 and longitudinal members 204 are received within bores 14 in associated devices 10. The position of cross members 200 relative to the length of longitudinal members 204 may be selected as desired by operating the appropriate coupling devices 10 in the manner described above. Similarly, longitudinal members 204 may be rotated relative to cross members 200 by operating the appropriate coupling devices 10 in the manner described above.

Although the present invention has been described with respect to tubular members A and B, it is to be appreciated that solid elongate cylindrical members may also be releasably coupled together using the present invention in the manner described above.

Furthermore, although the present invention has particular utility as a means for releasably securing together tubular members making up the frame of a backpack, it is to be appreciated that the present invention may be employed in a wide variety of contexts where two tubular members are to be releasably secured together in predetermined transversely extending, rotational selected and axial relation.

Since certain changes may be made in the above device without departing from the scope of the invention herein involved, it is intended that all manner contained in the above description or illustrated in the accompanying drawings shall be interpreted as illustrative and not in a limiting sense.

The embodiments of the invention in which an exclusive property or privilege is claimed are defined as follows:

1. A device for releasably coupling a first elongate cylindrical member in selected axial and rotational relation to a second elongate cylindrical member, the device comprising:

a housing having (a) a first bore for receiving one end of a first elongate cylindrical member, said first bore having a first longitudinal axis, and (b) a curved sidewall defining a second bore for receiving a second elongate cylindrical member, said second bore having a second longitudinal axis, wherein said first and second bores are positioned in said housing so that said first axis extends transversely to said second axis; and clamp means, coupleable with said housing and including a ring cam mounted for rotation about a third movable axis, for causing a selected portion of a second elongate cylindrical member positioned in said second bore to frictionally engage said curved sidewall with a force that varies as a function of the rotational position of said ring cam relative to said third axis so as to permit the second member to be secured in selected axial and rotational relation and predetermined transversely extending relation to said first axis.

2. A device according to claim 1, wherein said second bore is positioned in said housing and said ring cam is mounted so that said second axis extends parallel to said third axis.

3. A device according to claim 1, wherein said housing includes an elongate groove extending parallel to said second axis which is in communication with said second bore, and said clamp means additionally comprises a key latch positionable in said groove for engaging said ring cam so as to prevent said ring cam from moving along said third axis.

4. A device according to claim 1, wherein said ring cam comprises cylindrical inner and outer surfaces which are radially spaced from one another a distance which increases progressively from a first location on said ring cam to a second location on said ring cam, as measured around the circumference of said outer surface.

5. A device for releasably coupling a first elongate cylindrical member in selected axial and rotational relation to a second elongate cylindrical member, the device comprising:

a housing having (a) a first bore for receiving one end of a first elongate cylindrical member, said first bore having a first longitudinal axis, (b) a curved sidewall defining a second bore for receiving a second elongate cylindrical member, said second bore having a second longitudinal axis which extends perpendicular to said first axis, and (c) an elongate groove extending parallel to said second axis which is in communication with said second bore; and clamp means, couplable with said housing and including a ring cam mounted for rotation about a third movable axis which extends parallel to said second axis, for causing a selected portion of a second elongate cylindrical member positioned in said second bore to frictionally engage said curved sidewall with a force that varies as a function of the rotational position of said ring cam relative to said third axis so as to permit the second member to be secured in selected axial and rotational relation and predetermined transversely extending relation to said first axis, said clamp means including a key latch which is positionable in said groove for preventing said ring cam from moving along said third axis, further wherein said ring cam comprises cylindrical inner and outer surfaces which are radially spaced from one another a distance which increases progressively from a first location on said ring cam to a second location on said ring cam, as measured around the circumference of said outer surface.

6. A device for releasably coupling two elongate members in transversely extending relation to one another, the device comprising:

housing means for supporting a first elongate member in transversely extending relation to a second elongate member; and clamp means, coupled with said housing means and including a rotatable member designed to surround a second elongate member when supported by said housing means, (a) for preventing the second elongate member from rotating about, and moving along, its axis of elongation relative to said housing means when said rotatable member is in a first position and (b) for permitting the second elongate member to rotate about, and moving along, its axis of elongation relative to said housing means when said rotatable member is in a second position.

7. A backpack frame comprising:
(a) at least one elongate cylindrical cross member;
(b) at least one elongate cylindrical longitudinal member; and
(c) clamp means for releasably securing said at least one elongate cylindrical cross member to said at least one elongate cylindrical longitudinal member, said clamp means including at least one clamp device comprising:

housing means for supporting said at least one elongate cylindrical cross member in transversely extending relation to said at least one elongate cylindrical longitudinal member;

lock means, coupled with said housing means and including a rotatable member designed to surround said at least one elongate cylindrical longitudinal member when supported in said housing means, (a) for preventing said at least one elongate cylindrical longitudinal member from rotating about, and moving along, its axis of elongation relative to said housing means when said rotatable member is in a first position and (b) for permitting said at least one elongate cylindrical longitudinal member to rotate about, and move along, its axis of elongation relative to said housing means when said rotatable member is in a second position.

8. A clamping device comprising:
a housing having a first bore for receiving an elongate member, said housing including an opening coupled with said first bore, said first bore having a first longitudinal axis;

a key positioned in said opening; and clamp means, coupleable with said key and designed to surround an elongate member positioned in said first bore so as to be rotatable between locked and unlocked positions, for coacting with said key and said housing such that said clamp means and said key urge an elongate member positioned in said first bore into frictional engagement with said housing, when said clamp means is in said locked position, with a force sufficient to prevent the elongate member from moving axially or rotationally relative to said housing.

9. A device according to claim 8, further comprising means for securing a second elongate member to said housing.

10. A device for coupling two elongate members in transversely extending relation to one another, the device comprising:

housing means for supporting a first elongate member in transversely extending relation to a second elongate member; and clamp means, coupled with said housing means and including a ring member having a central axis and a smoothly curved outer surface radially spaced from said central axis a distance that varies between minimum and maximum values as measured about the circumference of said outer surface, (a) for preventing the second elongate member when supported by said housing means, from rotating about, and moving along its axis of elongation relative to said housing means when said ring member is in a first position and (b) for permitting the second elongate member, when supported by said housing means, to rotate about, and move along, its axis of elongation relative to said housing means when said ring member is in a second position.

11. A device according to claim 6, further wherein said clamp means includes means for coupling said rotatable member with said housing means so as to restrain said rotatable member from moving relative to said housing along the axis of elongation of a second member supported by said housing.

* * * * *